(12) United States Patent
Hänni et al.

(10) Patent No.: US 6,306,270 B1
(45) Date of Patent: Oct. 23, 2001

(54) ELECTROLYTIC CELL WITH BIPOLAR ELECTRODE INCLUDING DIAMOND

(75) Inventors: Werner Hänni, Peseux; André Perret, Les Geneveys-sur-Coffrane; Christos Comninellis, Mex, all of (CH)

(73) Assignee: CSEM Centre Suisse d'Electronique et de Microtechnique SA, Neuchatel (CH)

( * ) Notice: Subject to any disclaimer, the term of this patent is extended or adjusted under 35 U.S.C. 154(b) by 0 days.

(21) Appl. No.: 09/513,428

(22) Filed: Feb. 25, 2000

(30) Foreign Application Priority Data

Feb. 25, 1999 (FR) .................................................. 99 02482

(51) Int. Cl.[7] .............................. C25B 9/00; C25B 11/00
(52) U.S. Cl. ...................................... 204/268; 204/290.01
(58) Field of Search ............................... 204/268, 290.01, 204/290.15

(56) References Cited

U.S. PATENT DOCUMENTS 5,399,247 * 3/1995 Carey et al. ................... 204/294 X
5,894,077 * 4/1999 Jones et al. ...................... 205/688 X

* cited by examiner

Primary Examiner—Donald R. Valentine
(74) Attorney, Agent, or Firm—Baker Botts L.L.P.

(57) ABSTRACT

The present invention concerns an electrolytic cell including an anode, a cathode and at least one bipolar electrode arranged between the anode and the cathode. This cell is characterised in that said bipolar electrode includes a substrate and a compact diamond film which is made conductive by a doping agent and which coats said substrate.

9 Claims, 1 Drawing Sheet

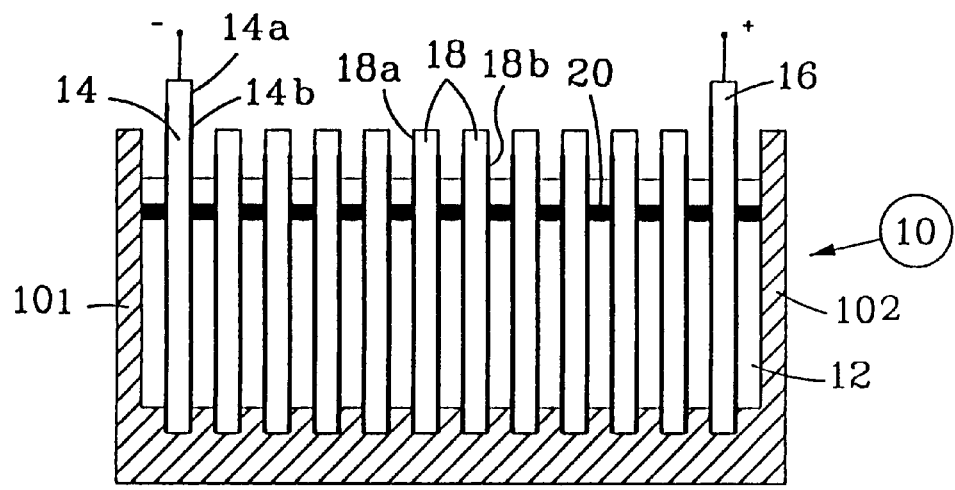
Fig.1
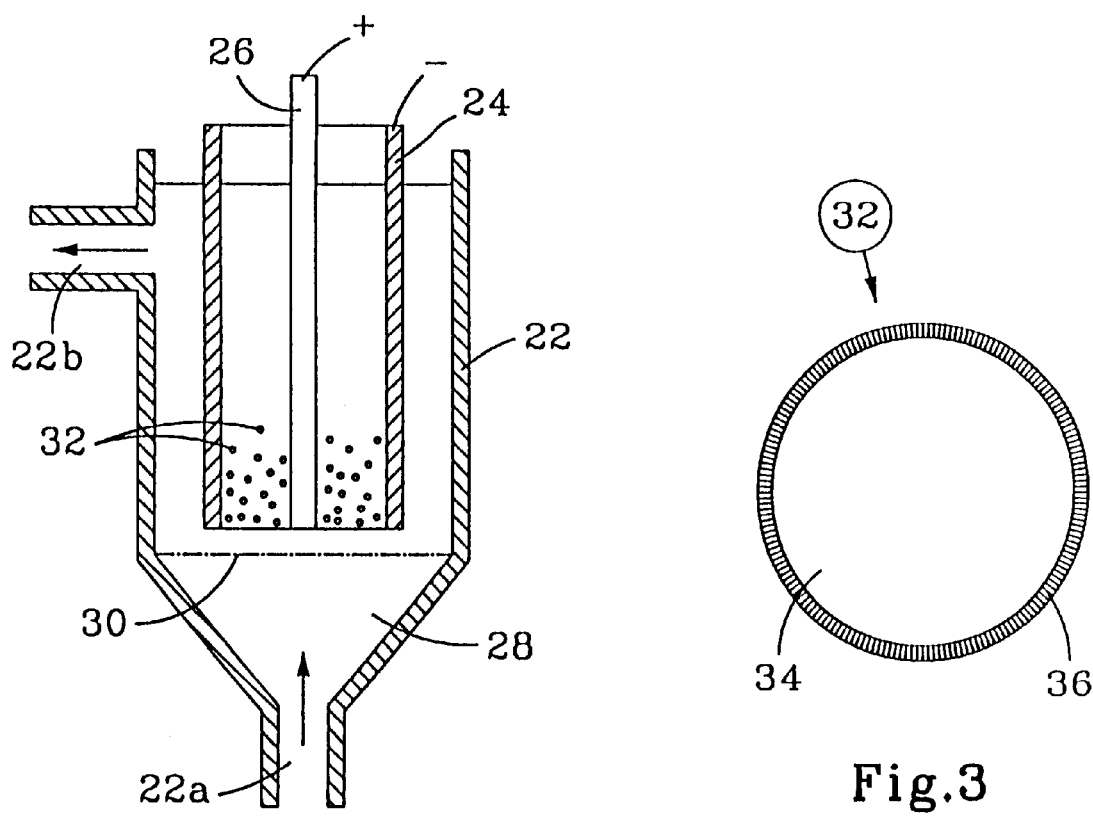
Fig.2
Fig.3

ELECTROLYTIC CELL WITH BIPOLAR ELECTRODE INCLUDING DIAMOND

The present invention concerns an electrolytic cell with a bipolar electrode, i.e. a cell wherein the anode and the cathode are separated by at least a third electrode, called a bipolar electrode, itself forming both an anode and a cathode. It will easily be understood that the presence of such an electrode allows the electrochemical reaction surface and, consequently, the efficiency of the cell, to be increased.

For more details regarding electrolytic cells with a bipolar electrode or electrodes, reference could be made, for example, to the publication by Ch. Comninellis et al. in the Journal of Applied Electrochemistry, 21 (1991) 415–418.

For a bipolar electrode to be able to fulfil its function, it is imperative that it is made of a material which is compatible both with the anode function and the cathode function. In the present state of the art, nickel, copper and lead are generally used.

An advantageous application of bipolar electrodes is the integration thereof in electrolytic cells intended for the pollution abatement of waste water by oxidising the contaminating elements contained therein. Certain non-biodegradable organic constituents can thus be decomposed. Such an approach has however two drawbacks. On the one hand, the electrodes used to date tend to wear out quickly. On the other hand, they release metals, particularly heavy metals, which are pollutants.

Making bipolar electrodes from platinum has also been proposed, but they have the drawback of wearing out quite quickly. Moreover, this metal is very expensive.

Bipolar electrodes can either take the form of plates, or the form of a plurality of balls, typically having a diameter comprised between 0.5 and 10 mm, suspended in the electrolyte in movement, as proposed, for example, by M. Fleischmann et al. in the Journal of Electrochemical Society, Vol. 116, No. 11, November 1969.

Unfortunately the lifetime of these conductive balls, which are generally made of copper or graphite, is quite short because of mechanical effects due to their agitation in the electrolyte and the dissolution, or respectively oxidisation of the material itself. Electrolytic cells including such electrodes thus require almost permanent monitoring. Consequently, they cannot easily be used in applications such as water pollution abatement.

The main object of the present invention is to propose an electrolytic cell with a bipolar electrode having the double peculiarity of having a long lifetime and not releasing any pollutants into the electrolyte.

More precisely, the invention concerns an electrolytic cell including an anode, a cathode and at least one bipolar electrode arranged between the anode and the cathode, characterised in that said bipolar electrode includes a substrate and a compact diamond film which is made conductive by a doping agent and which coats the substrate.

Advantageously, the anode and the cathode also include a substrate and a compact diamond film which is made conductive by a doping agent and which coats the substrate.

The material forming the substrate can be selected from among silicon, silicon carbide, both made conductive by doping, quartz and glass. It may also be a refractory transition metal preferably selected from among zirconium, molybdenum, tantalum, niobium, titanium and silicides thereof.

Preferably the doping agent used to make the diamond conductive is boron, nitrogen or a mixing of both. The diamond film has, moreover, a thickness of 0.1 to 1 $\mu$m.

The cell according to the invention can either include a bipolar electrode in the form of a plate or a plurality of bipolar electrodes in the form of balls.

Other features of the invention will become clear from the following description, made with reference to the annexed drawings in which:

FIG. 1 shows an electrolytic cell including bipolar electrodes formed of plates;

FIG. 2 shows an electrolytic cell including bipolar electrodes in the form of balls in suspension; and FIG. 3 shows, in cross-section, one of the balls of FIG. 2.

In FIG. 1, one can see, in cross-section, an electrolytic cell which includes a rectangular container 10 made of insulating material, containing an electrolyte 12. It includes two end walls 101 and 102, in proximity to which are arranged respectively an anode 14 and a cathode 16 in the form of plates parallel to each other.

Several bipolar electrodes 18, also in the form of plates, are inserted, at regular intervals, in the space between the anode and the cathode, and parallel thereto.

Of course, anode 14, cathode 16 and bipolar electrodes 18 must not be in contact with each other. Spacers 20 made of insulating material are thus inserted between them for this purpose.

In the case of an electrolytic cell intended for the purification of waste water, the latter forms the electrolyte and passes through container 10. The pipes enabling this circulation are not shown.

According to the present invention, anode 14, cathode 16 and bipolar electrodes 18 are all formed of an electrically conductive substrate, bearing the reference a, coated on both its faces, at least in the submerged portion thereof, with a diamond film b, which is doped to make it electrically conductive.

The substrate may be formed of a silicon or silicon carbide plate, both doped by methods known to those skilled in the art, so as to reduce their resistivity to a value which, typically, is of the order of 1 to 3 m$\Omega$cm. The substrate can also be formed of vitreous carbon or a composite material including a network of carbon fibres amalgamated with pyrolitic carbon and/or silicon carbide.

The substrate may also be a metal plate, preferably a refractory transition metal, advantageously selected from among zirconium, molybdenum, tantalum, niobium, titanium and silicides thereof.

Whatever form it takes, the conductive substrate must initially carry diamond particles forming a growth nucleus for the diamond film which is formed at the surface thereof, according to a known method, by HFCVD (hot filament chemical vapour deposition) in an enclosure at a temperature comprised between 600 and 900° C. The diamond is made conductive by doping using boron, nitrogen or a mixing of both, which is introduced during deposition of the film in the form of trimethylboron (TMB) gas, ammonia or any other substance (phosphorus, carbon) having the same effect.

The method described hereinbefore allows anodes, cathodes and bipolar electrodes coated on both faces with a diamond film of compact polycrystalline structure to be made, whose resistivity is less than or equal to 0.2 $\Omega$cm, for a boron concentration of approximately 3500 ppm. The thickness of this conductive film of doped diamond is typically comprised between 0.1 and 1 $\mu$m.

For more details as to the manufacturing of such electrodes, reference will be made to the article entitled <<Diamond electrodes and microelectrodes >>by A. Perret et al., which appeared in Electrochemical Society Proceedings, Volume 97–32.

In a variant, the outer faces of anode 14 and cathode 16 (i.e. those which face ends 101 and 102 of the container) can also be coated with a diamond film.

According to another variant, only the bipolar electrodes are made as indicated hereinbefore, the anode and the cathode being then made of a conductive material, such as silicon, silicon carbide, graphite, vitreous carbon, a carbon fibre based composite material, as mentioned hereinbefore, or tantalum, titanium, zirconium, niobium, molybdenum or silicides thereof.

FIG. 2 shows another type of electrolytic cell using bipolar electrodes in the shape of balls, in accordance with the structure described in the aforecited publication by M. Fleischmann. This cell includes a cylindrical container 22 containing inside it a tubular anode 24 and a rod-shaped cathode 26 arranged along the axis of the anode. Anode 24 and cathode 26 are, apart from their shape, and thus, as regards the substrate and diamond film of which they are formed, identical to electrodes 14 and 16 described in the embodiment of FIG. 1.

Container 22 includes, in its base, an inlet 22a and, in its top part, an outlet 22b, respectively intended to cause an electrolytic solution 28 to go in and out of the container. A membrane 30 is placed in the bottom part of the container, under the two electrodes and above inlet 22a. It has a porous structure, so as to allow the electrolyte to pass when it comes up from inlet 22a towards outlet 22b. Bipolar electrodes 32, formed from a plurality of spherical particles held in suspension in the electrolyte, in accordance with the teaching of the publication by M. Fleischmann, are arranged in the space situated above the membrane. Their diameter is, typically, comprised between 0.5 and 10 mm. The structure of the membrane is selected so that the balls cannot pass through it.

As FIG. 3 shows, each bipolar electrode 32 includes a spherical core 34, advantageously made of doped silicon or silicon carbide, by methods known to those skilled in the art, in order to reduce its resistivity to a value of the order of 1 to 3 m$\Omega$cm. The ball thus made conductive is totally coated with a conductive diamond film 36 doped with boron typically having a thickness of the order of 0.1 to 1 $\mu$m. As indicated with regard to the electrodes of FIG. 1, boron doping is achieved using trimethylboron (TMB) gas or ammonia introduced into the HFCVD enclosure during the diamond deposition step. As mentioned previously, other doping agents, such as nitrogen, phosphorus or carbon, can be used to make the diamond electrically conductive. This film has a compact polycrystalline structure, so that core 34 is totally protected.

The manufacture of silicon carbide balls coated with diamond is known for ball bearing applications. For more details, reference will be made, for example, to the publication by M. Drory et al. entitled <<Microstructural effects on the performance of diamond coatings for bearing applications >>at the 2nd International Conference on the Applications of Diamond Films and Related Materials >>held at Tokyo in 1993.

Spherical bipolar electrodes thereby obtained allow wear and pollution to be avoided, simply because they are coated with a diamond film.

The doped silicon carbide is selected, according to the invention, to form the core of the bipolar electrodes, because of its low density which allows said balls 32 to remain in suspension in the electrolyte when the latter moves up in the container. In a variant, core 34 of the spheres can however be made of doped silicon, silicon oxide, quartz, graphite, or refractory transition metal, more particularly, zirconium, molybdenum, tantalum, niobium, titanium or silicides thereof.

What is claimed is:

1. Electrolytic cell comprising an anode, a cathode and at least one bipolar electrode arranged between the anode and the cathode, wherein:

said bipolar electrode comprises a substrate and a compact diamond film;

said diamond film is made conductive by a doping agent; and said diamond film coats said subtrate.

2. Electrolytic cell according to claim 1, wherein the anode and the cathode also include a substrate and a compact conductive diamond film coating said substrate.

3. Electrolytic cell according to claim 2, wherein the diamond film has a thickness comprised between 0.1 and 1 $\mu$m.

4. Electrolytic cell according to claim 1, wherein the material forming said substrate is selected from the group consisting of silicon, silicon carbide, both made conductive by doping, quartz, vitreous carbon and composite material including a network of carbon fibres amalgamated with pyrolitic carbon and/or silicon carbide.

5. Electrolytic cell according to claim 1, wherein the material forming said substrate is a refractory transition metal.

6. Electrolytic cell according to claim 4, wherein said transition metal is selected from the group consisting of zirconium, molybdenum, tantalum, niobium, titanium and silicides thereof.

7. Electrolytic cell according to claim 1, wherein the doping agent is boron or nitrogen or a mixing of boron and nitrogen or phosphorus or carbon.

8. Electrolytic cell according to claim 1, further comprising a bipolar electrode in the form of a plate.

9. Elctrolytic cell according to claim 1, further comprising a plurality of bipolar electrodes in the form of balls.

* * * * *